Patented Oct. 23, 1951

2,572,709

UNITED STATES PATENT OFFICE 2,572,709

THENALMALONONITRILES

William S. Emerson and Tracy M. Patrick, Jr., Dayton, Ohio, assignors to Monsanto Chemical Company, St. Louis, Mo., a corporation of Delaware No Drawing. Application August 5, 1948, Serial No. 42,736

6 Claims. (Cl. 260—329)

1

This invention relates to a family of new chemical compounds derived from thiophene which have particular activity as germicides and agricultural fungicides.

The primary purpose of this invention is to develop new products from thiophene. A further purpose is to prepare compounds having activity as germicides and fungicides.

The new chemical compounds have chemical structures as follows:

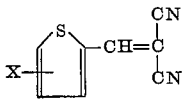

wherein X is a radical of the group consisting of hydrogen, halogen, and alkyl, including fluorine, chlorine, bromine, iodine, methyl, ethyl, n-propyl, isopropyl, n-butyl, t-butyl, isobutyl, amyl and higher homologous radicals, although chlorine and the alkyl radicals of up to four carbon atoms are preferred.

The new compounds may be prepared by mixing the desired thiophenealdehyde with malononitrile in the presence of a suitable solvent, and then heating the mixture with a suitable catalyst. Useful solvents for the practice of this invention are ethanol, methanol, dioxane, propanol, benzene, butanol, toluene, chlorobenzene, xylene, and ethyl acetate. Any amine may be used as the catalyst, for example methyldodecylamine, pyridine, triethanolamine, piperidine, dibutyl amine, and morpholine. The new chemical compositions are precipitated from the reaction mass by boiling off part of the solvent and/or by the addition of a nonsolvent. Upon cooling, the new compounds separate out as crystalline materials, and may be purified by recrystallization from suitable solvent, for example ethyl alcohol.

Further details of the practice of this invention are set forth with respect to the following specific example.

Example

A reaction flask was charged with 11.2 grams of 2-thiophenealdehyde, 6.6 grams of malononitrile and 100 cc. of absolute ethanol. The reaction mixture was heated to its boiling point. Two drops of piperidine were added and the heating continued for five minutes. Upon cooling, the reaction product separated out as orange crystals. After drying, the crystalline material was redissolved in alcohol and precipitated therefrom by cooling. After two recrystallizations, a solid material having a melting point of 97–98° C. was obtained and identified as 2-thenalmalononitrile.

The invention is defined by the following claims.

2

We claim:
1. A chemical compound having the structure:

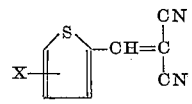

wherein X is a radical of the group consisting of halogen, alkyl and hydrogen.
2. 2-thenalmalononitrile.
3. 5-chloro-2-thenalmalononitrile.
4. 5-methyl-2-thenalmalononitrile.
5. A method of preparing a 2-thenalmalononitrile which comprises mixing 2-thiophenealdehyde having the structure:

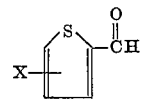

wherein X is a radical of the group consisting of halogen, alkyl and hydrogen, and malononitrile, heating the mixture in the presence of a solvent and an amine and separating the resulting product.
6. A method of preparing 2-thenalmalononitrile which comprises mixing 2-thiophenealdehyde and malononitrile in the presence of ethyl alcohol, heating the mixture in the presence of an amine, precipitating the resulting product by cooling and recrystallizing the product.

WILLIAM S. EMERSON.
TRACY M. PATRICK, Jr.

REFERENCES CITED

The following references are of record in the file of this patent:

Heuck: Chemische Berichte, 28, 2253 (1895).
Bernthsen and Sudborough, Organic Chemistry, p. 549, Van Nostrand, N. Y., 1922 edition.
Whitmore: Organic Chemistry, pp. 884, 893, Van Nostrand, N. Y., 1937.
Richter: Organic Chemistry, pp. 649–650, Wiley, N. Y., 1938.
Seeman: Canadian Journal of Research, vol. 19, sec. B, p. 291 (1941).
Alles: J. Pharm. Exp. Ther. 72, 265 (1941).
Steinkopf: Die Chemie des Thiophens, p. 21, Steinkopf, Dresden, 1941, Edwards Lithoprint, 1944.
Powers: Advancing Fronts in Chemistry, vol. II, p. 33, Reinhold Pub. Co., N. Y., 1946.
Williams: Detoxication Mechanisms, pp. 194, 197, 198, Wiley, N. Y., 1947.
Caesar and Sachaven, Ind. Eng. Chem. 40, 922 (1948).
Ex parte Bywater and Coleman, 83, U. S. P. Q. 4.